313-595 SR
7/6/86 OR F 000,060

United States Statutory Invention Registration [19]

[11] Reg. Number: H60
[45] Published: May 6, 1986

Elkins et al.

[54] LONG-LIFE TRIGGERED SPARK GAP

[75] Inventors: Jackie N. Elkins, West Suffield, Conn.; Steve Friedman, Dorchester; David Turnquist, Winchester, both of Mass.

[73] Assignee: The United States of America as represented by the Secretary of the Army, Washington, D.C.

[21] Appl. No.: 502,420

[22] Filed: Jun. 8, 1983

[51] Int. Cl.[4] ..... H01J 17/30; H01J 17/46; H01J 61/54

[52] U.S. Cl. ..... 313/595; 313/620; 313/631; 313/633; 313/643

[58] Field of Search ..... 313/595, 601, 620, 631, 313/633, 643

[56] References Cited

U.S. PATENT DOCUMENTS

| | | | |
|---|---|---|---|
| 3,230,410 | 1/1966 | Hafkemeyer, Jr. et al. | 313/631 |
| 3,710,178 | 1/1973 | Johnson et al. | 313/601 |
| 4,246,509 | 1/1981 | Schäfer et al. | 313/643 |
| 4,280,098 | 7/1981 | Veraldi | 313/595 |

FOREIGN PATENT DOCUMENTS

| | | | |
|---|---|---|---|
| 3109 | 1/1980 | Japan | 313/643 |

*Primary Examiner*—John F. Terapane
*Assistant Examiner*—Susan Wolffe
*Attorney, Agent, or Firm*—Anthony T. Lane; Jeremiah G. Murray; Robert A. Maikis

[57] ABSTRACT

A discharge device for use with pulsed, $CO_2$ laser power conditioner systems, is disclosed. The device is comprised of Elkonite or molybdenum electrodes in a controlled nitrogen-xenon-oxygen environment, and having long life potential of close to twenty million discharges possible.

1 Claim, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LONG-LIFE TRIGGERED SPARK GAP

The Government has rights in this invention pursuant to contract number DAAK20-80-C-0290 awarded by the Department of the Army.

BACKGROUND AND FIELD OF THE INVENTION

This invention relates to the field of lasers and laser power circuitry in particular.

In the field of laser circuit devices, long-life, compact power conditioners for driving pulsed $CO_2$ lasers have considerable application potential in military missions such as rangefinding and target recognition. Experience has indicated however that the conditioners have low life span and that a low lifetime component in the power conditioners has frequently been the triggered spark cap which typically fails after much less than 1 million shots. Accordingly an increase in life span and number of shots until burnout would be a greatly useful improvement in the laser art and enable needed development of longer life span power conditioners for these type devices.

BRIEF DESCRIPTION OF THE INVENTION

The discharge device described herein for use with the pulse lasers herebefore described, at some 30 Kv potential, makes use of positioned Elkonite, and sometimes molybdenum, electrodes in a pressurized select proportion nitrogen-69%, oxygen-1%, and xenon-30%, gas mixture. (Elkonite is a trade name for copper infiltrated tungsten material). The cap shaped electrodes are positioned by compatable ceramic supports, and the gaseous environment is maintained within a housing, of ceramic, which housing can be made as small as 1½" long and 1" in diameter. A lifetime of some 20 million sparks as a 5 HZ triggering rate is believed possible with this arrangement. The spark gap can be used to deliver a high current pulse of some 2 kiloamperes, over some 100 nanoseconds duration.

OBJECTS OF THE INVENTION

Accordingly, it is an object of this invention to provide a discharge device tending to long life, with an increased number of shots.

Another object of this invention is to devise a high current capacity spark gap device which is suitable for use with power conditioners for pulsed laser applications.

These and other objects and advantages of the invention will become readily apparent to those skilled in the art in connection with the specification of the invention and the following drawings, in which:

LIST OF FIGURES

FIG. 1 shows a cross-sectional view of a long life spark gap device according to this invention; and FIG. 2 shows a circuit for activating and testing the spark gap of this invention.

DETAILED DESCRIPTION OF THE INVENTION

Figure 1:
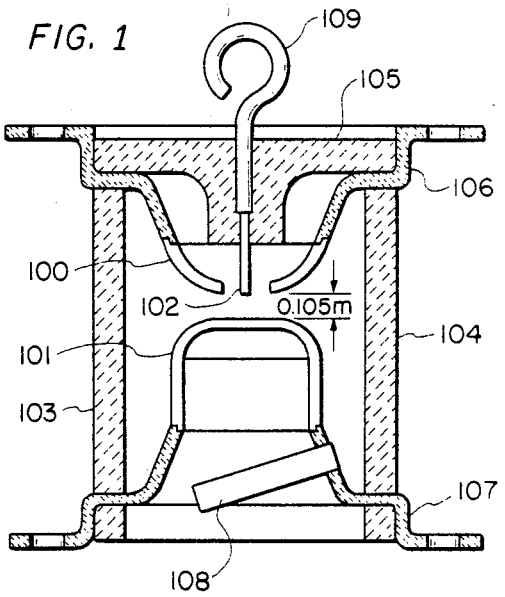

FIG. 1 illustrates a cross-sectional side view of a spark gap constructed according to the technique of this invention. Metal electrodes are shown at 100 and 101, and a metal trigger probe is also shown, at 102. The electrodes, according to this invention, are spaced apart not more than 0.105, (+0.005) inches; they are made of Elkonite, which is a trade name for a copper infiltrated tungsten material. The electrodes are kept within a pressurized gasseous environment of pure Xe, $Xe+O_2$ or $Xe+O_2+N_2$. The best environment is believed to be 30%-Xe, 1%-$O_2$, and 69%-$N_2$. The above mentioned electrode material, spacing, and gaseous environments have been discovered by us to be a combination believed to be an optimum for a long life device as is an objective of this invention. While other spacings, materials, gases and other parameters overall may also be used within the scope of this invention, they are believed less effective than those stated. However, the invention is nonetheless reserved to encompass all variations of these said parameters and it is possible that other combinations might yet yield even longer life devices than those shown. The sides 103, 104 are ceramic, as is the top plate 105; electrode holders 106 and 107 are metal conductors to initiate a spark. It is possible to also use molybdenum for the electrodes. There is a tube 108 in the wall of 107 gaseous, which is used to fill and seal the pressurized, specific proportion gasseous state within the space of the sealed cavity formed by the side and top walls, electrodes, and electrode holders, e.g. It is believed that one can obtain even as high as 20 million sparks from the device shown, with the parameters mentioned earlier. Most of the discharge occurs in the region where the (closely spaced) electrodes are nearly parallel; thus, somewhat of a shadow effect is created whereby most of the sputter products are deposited in a band opposite the spacing. This leaves a portion of the internal insulator wall with minimal deposited sputter material and helps minimize the chance of internal flashover along the insulator wall. Recessing the ceramic spacer between the trigger probe tip 102 and the adjacent electrode 100 prevets trigger shorting by coating of this ceramic spacer with sputtered debris. Normally, the main discharge keeps this ceramic clean but at the relatively low current level involved in this application the discharge would not have had sufficient power to clean effectively; the problem is alleviated somewhat by the recessing step explained here.

Shown above therefore is a triggerable spark gap for use as a long-life switching element, which can be employed for pulsed $CO_2$ laser applications with extended operating life believed in range of 20 million pulses. The long life performance of the device, among other reasons, is believed due to the unique combination of electrode material, gas fill composition and pressure, and electrode geometry. Compactness can also be achieved, to be noted; the gaps, which are designed to switch 3 joules at 25 kV, can be made as small as only 1.0 inch in diameter and 1.5 inches in length.

Figure 2:
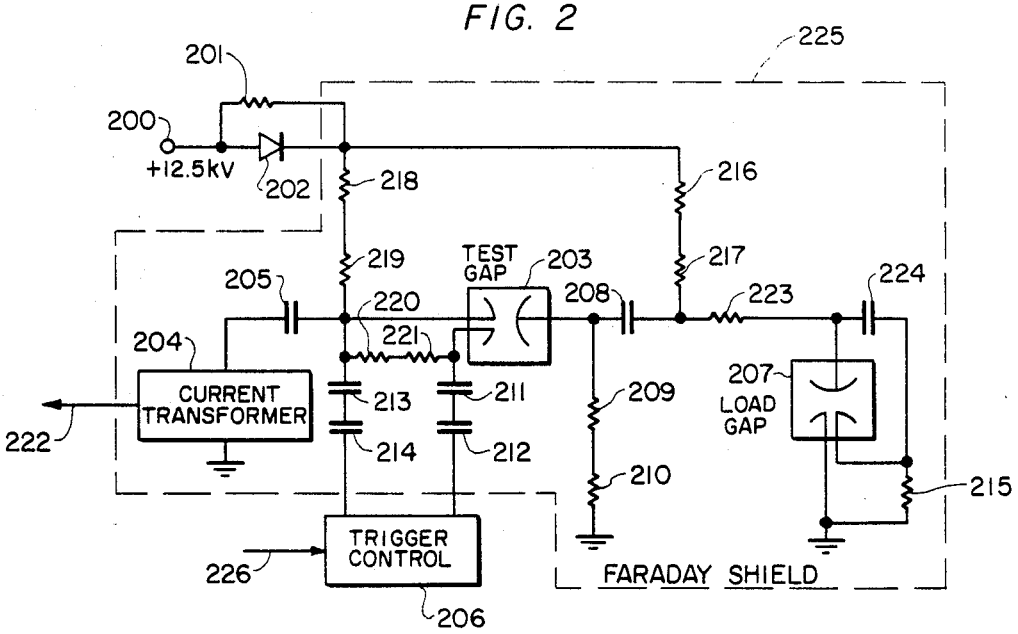

FIG. 2 shows a circuit for activating and/or testing the spark gap of this invention. A list of some circuit parameters occurs below;

Element—Value
201—100 MΩ
205—0.017 μF
208—0.017 μF
209—1 KΩ, 1 W
210—1 KΩ, 1 W
211—0.001 μF, 6 KV
215—10 MΩ
216—56K, 2 W
217—56K, 2 W
218—56K, 2 W 219—56K, 2 W
220—11 MΩ
221—11 MΩ
223—16.5 Ω, 16 W
224—12 pf.

The spark gap, appearing at 203, is fed from capacitor 205, charged in parallel through the resistors 218, 219, and discharged in series through the spark gap 203 and a (simulated) $CO_2$ laser load, consisting of a triggered spark gap 207 in series with a resistor 223, whose value approximates a laser dynamic impedance at peak current. The load gap 207 is triggered by capacitive coupling between the trigger electrode and the high voltage 208 side of the spark gaps. This load scheme seems more stable than use of over-voltage spark gaps. A high current pulse waveform in the KA range is delivered, which pulse can be outputted at 222 or other points. To simulate a 1% laser fault rate, the resistor 223 is replaced by 8 ohms for 5000 shots at the end of each 0.5 million life test cycle. This can produce an even larger current pulse than as before. (Currents can be measured using a current transformer 204). The activation circuit of FIG. 2 is one laser arrangement of the spark gap 203, if 207 were replaced by the actual laser.

Shown above therefore is a long-life triggered spark gap which is suitable for use as the switching element in compact power conditioners for pulsed $CO_2$ laser applications. This sparked gap has a believed operating life of over 2 million pulses and meets al the electrical, geometrical, and enviromental (MIL-STD-810-C) requirements for use in a pulsed $CO_2$ laser power conditioner having the electrical specifications listed below:

Load: $CO_2$Laser (simulated)
Nominal Load Discharge Voltage: 25 kV
Energy to Discharge: 3 Joules
Normal Discharge Current-Peak: 1 kA
Fault Discharge Current-Peak: 2 kA
Pulse Width (50%): 200 nsec
Pulse Risetime (10% to 90%): 100 nsec
Pulse faultime (90% to 10%): 100 nsec Pulse Rate: 1 Hz
Misfire Rate: <1%

While the invention may have been described with respect to a particular embodiment or embodiments, the invention is nonetheless intended to include other, and all embodiments, including substitutions and modifications, within the spirit and scope of the invention, this specification, and the appended claims.

What is claimed is:

1. A triggered spark gap for pulsed $CO_2$ laser power conditioners comprising:

a gas-tight housing;

a pair of cap-shaped electrodes disposed within said housing at opposite ends thereof and spaced apart a distance no greater than 0.105±0.005 inches, said electrodes being fabricated of copper infiltrated tungsten material and being adapted to be coupled across a voltage to be switched, one of said electrodes at one end of said housing having an electrode opening therein;

an elongated trigger electrode having one end thereof forming an electrode tip and the other end thereof adapted to be coupled to a source of trigger voltage;

trigger electrode support means fabricated of an electrical insulating material for supporting said trigger electrode with said electrode tip thereof substantially at the center of said electrode opening so that a space is defined between said electrode tip and said electrode opening, said trigger electrode support means being mounted on said one housing end and extending only a part of the distance between said housing end and said one electrode so that no part of said trigger electrode support means projects into said space between said trigger electrode tip and said electrode opening; and a mixture of gases in said housing filling the space between said cup-shaped electrodes and said space between said trigger electrode tip and said electrode opening, said mixture of gases consisting of 69% nitrogen, 1% oxygen and 30% xenon.

* * * * *